(12) United States Patent
Schneider et al.

(10) Patent No.: US 10,554,441 B2
(45) Date of Patent: Feb. 4, 2020

(54) AUTOMATION SYSTEM AND METHOD FOR OPERATION OF THE SYSTEM

(71) Applicant: Siemens Aktiengesellschaft, Munich (DE)

(72) Inventors: Dirk Schneider, Lichtentanne (DE); Tobias Weber, Limbach-Oberfrohna (DE); Claudia Zschoppe, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/972,411

(22) Filed: May 7, 2018

(65) Prior Publication Data

US 2018/0331848 A1    Nov. 15, 2018

(30) Foreign Application Priority Data

May 9, 2017    (EP) .................................... 17170187

(51) Int. Cl.
*H04L 12/40* (2006.01)
*G05B 19/4155* (2006.01)
*G06F 13/10* (2006.01)

(52) U.S. Cl.
CPC .......... *H04L 12/40* (2013.01); *G05B 19/4155* (2013.01); *G06F 13/10* (2013.01);
(Continued)

(58) Field of Classification Search
CPC .............. H04L 12/40; H04L 12/40032; H04L 2012/4026; G06F 13/10; G05B 19/0423; G05B 2219/33147
See application file for complete search history.

(56) References Cited

U.S. PATENT DOCUMENTS 10,324,441 B2 *  6/2019  Schneider .......... G05B 19/0426
2002/0093951 A1    7/2002  Rupp et al.
(Continued)

FOREIGN PATENT DOCUMENTS

EP         2682827       1/2014
JP      2000-286919     10/2000
(Continued)

OTHER PUBLICATIONS

Office Action dated Jul. 2, 2019 issued in Chinese Patent Application No. 2018-079367.

*Primary Examiner* — Glenn A. Auve
(74) *Attorney, Agent, or Firm* — Cozen O'Connor

(57) ABSTRACT

An automation system includes a first/second control devices having first/second field bus terminals, a field bus, a peripheral assembly having at least one input/output peripheral module for connection to sensors and/or actuators, where the peripheral assembly includes an interface module having a third field bus terminal for communication to and/or from the control devices, and where the interface module includes at least one input/output module storing interconnect information that creates an association between inputs/outputs of the at least one input/output peripheral module and the control devices, and where the interface module additionally includes a virtual data set module in which a data set receiving module is associated with the first control device to which a data set is writable by the first control device, and includes a data set transmitting module associated with the second controller from which the data set is retrievable by the second control device.

3 Claims, 2 Drawing Sheets

(52) U.S. Cl.
   CPC ............... *G05B 2219/33147* (2013.01); *H04L 2012/4026* (2013.01)

(56) References Cited

U.S. PATENT DOCUMENTS

| | | | |
|---|---|---|---|
| 2009/0204687 A1* | 8/2009 | Ito | G06F 9/54 709/218 |
| 2014/0005803 A1 | 1/2014 | Dausend | |
| 2017/0344675 A1* | 11/2017 | Lutz | G05B 17/02 |
| 2018/0321662 A1* | 11/2018 | Nixon | G05B 19/0421 |

FOREIGN PATENT DOCUMENTS

| | | |
|---|---|---|
| JP | 2000-347712 | 12/2000 |
| JP | 2003-507810 | 2/2003 |
| JP | 2007-200305 | 8/2007 |
| JP | 2013-182391 | 9/2013 |

* cited by examiner

AUTOMATION SYSTEM AND METHOD FOR OPERATION OF THE SYSTEM

BACKGROUND OF THE INVENTION

1. Field of the Invention

The invention relates to an automation system, including a first control device having a first field bus terminal, a second control device having a second field bus terminal, a field bus, a peripheral assembly having at least one input/output peripheral module for connection to sensors and/or actuators, where the peripheral assembly includes an interface module having a third field bus terminal for communication to and/or from the control devices, where the interface module includes at least one input/output module in which there is stored interconnect information, and where the interconnect information creates an association between inputs/outputs of at least one input/output peripheral module and the control devices.

The starting point for the invention is an automation system or a field bus system having a cyclic exchange of input and output data between a plurality of communication stations, typically programmable logic controllers and peripheral systems.

2. Description of the Related Art

A direct cyclic data exchange between a plurality of programmable logic controllers, which is required, for example, for coupling machines comprising a production line, is not supported by conventional systems because communication lines are only established between the programmable logic controllers and the peripheral systems.

SUMMARY OF THE INVENTION

In view of the foregoing, it is the object of the invention to provide simple, flexible and powerful field bus communications between a plurality of programmable logic controllers.

This and other objects and advantages are achieved in accordance with the invention by an automation system in which an interface module additionally includes a virtual data set module in which a data set receiving module is associated with a first control device and to which the first control device can write a data set, and includes a data set transmitting module within the virtual data set module associated with the second controller and from which the second control device can retrieve the data set, and simultaneously the virtual data set is formed such that the data set is copied from the data set receiving module to the data set transmitting module such that a communication path is established between the control devices. The input/output modules can be viewed as a configurable memory area in which, in the event of connection to a control device, corresponding configuration data can be transmitted to the interface module. The virtual data set modules can be viewed as a configurable memory area in which, in the event of connection to a control device, corresponding configuration data can be transmitted to the interface module and stored. Accordingly, the interface module in accordance with the invention has two types of modules, i.e., the input/output modules for the actual peripheral, and at least one virtual data set module for communication between the control devices.

Utilizing multiple access to data set channels of a peripheral system, as in the case of Profinet Shared Device, and using virtual data set modules in the peripheral system, in particular in the interface module, has the effect of producing inter-PLC (Programmable Logic Controller) communication, which means that the control devices can exchange data sets (records) with one another over the virtual data set module. Here, the data sets of a control device that writes can be written to a virtual data set receiving module of the interface module and, by way of a data set transmitting module, can be associated with a further control device or even a plurality of further control devices.

It is also an object of the invention to provide a method for operating an automation system. In accordance with the method of the invention, a first and a second control device exchange data with a peripheral assembly over a field bus, where the data exchange relates on the one hand to transmitting output data to the peripheral module, with the output data being transferred to an input/output peripheral module over an input/output module in an interface module of the peripheral assembly and, on the other hand, to receiving input data from the peripheral module, with the input data being received from the input/output peripheral module, over the input/output module in the interface module of the peripheral assembly.

In accordance with the invention, operated in the interface module is a virtual data set module in which there is associated with the first control device a data set receiving module to which the first control device can write a data set, and furthermore there is associated with the second control device a data set transmitting module from which the second controller can retrieve the data set, and simultaneously, in the virtual data set module, the data set of the first control device is copied from the data set receiving module to the data set transmitting module, as a data set for the second control device.

In an advantageous embodiment of the method, associating the data set receiving module with the first control device causes formation of a first channel for the first control device, and associating the data set transmitting module with the second control device has the effect of forming a second channel for the second control device, where the first control device communicates with the second control device via the peripheral module over a data transmission path that includes the first channel and the second channel.

When multiple access to input/output channels of the peripheral module is utilized, as performed, for example, with PROFINET Shared Device, and using the virtual data set module in the peripheral assembly or the peripheral module, direct communication is established from one control device to another control device (inter-PLC communication).

From the point of view of a control device accessing data, communication is always point-to-point between two field bus stations. Utilizing and splitting up the additional communication channels for data sets that are made available by the virtual data set module is a function of the controller applications. For example, it becomes possible to transmit data sets and parameter and status information of one controller application to another control device.

Implementation of the method could take the form of a software solution in the interface module of the peripheral assembly, and would have the advantage that no additional field bus assemblies, such as a Profinet/Profinet coupler, and no additional wiring for PLC/PLC communication are required. This is regarded as a cost advantage if the control devices used do not support either controller to controller communication) (C2C) or I/O controller multicast communication (CC-DX). Communication between the control devices is performed over established field bus communication mechanisms and does not make any new demands of already existing technology or the accessing components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing describes an exemplary embodiment of the invention, in which.

DETAILED DESCRIPTION OF THE EXEMPLARY EMBODIMENTS

Figure 1:
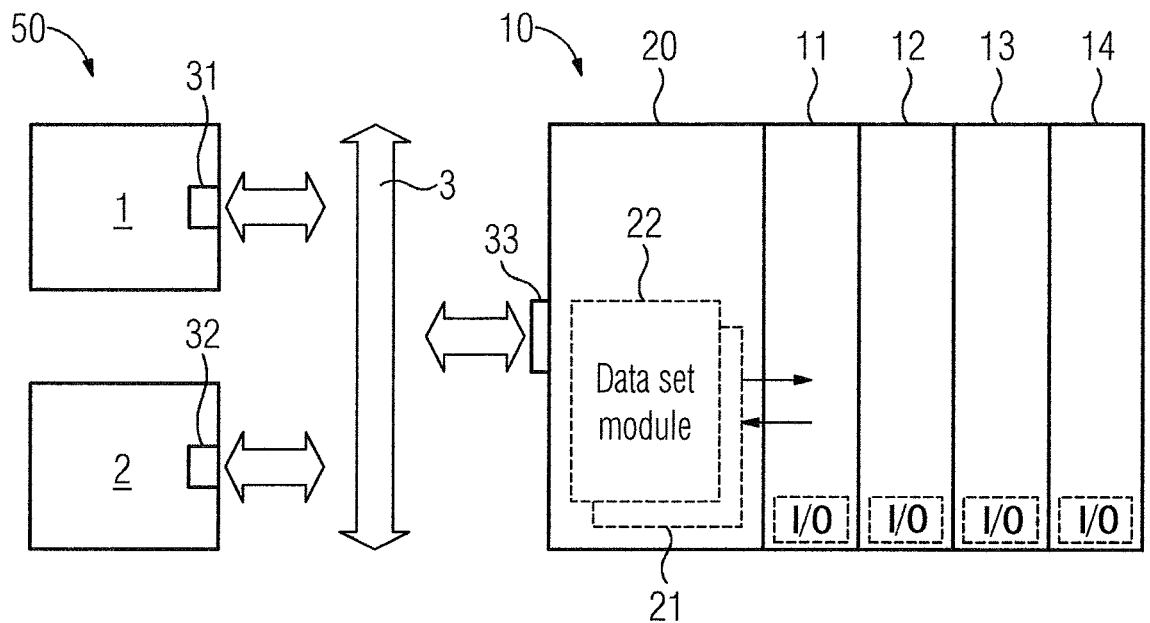
FIG. 1 shows an automation system in accordance with the invention.

FIG. 1 illustrates an automation system 50 having a first control device 1 and a second control device 2. The first control device 1 is connected to a field bus 3 over a first field bus terminal 31. The second control device 2 is connected to the field bus 3 over a second field bus terminal 32. A peripheral assembly 10 is connected to the field bus 3 over a third field bus terminal 33. The peripheral assembly 10 includes an interface module 20 on which a first input/output peripheral module 11, a second input/output peripheral module 12, a third input/output peripheral module 13 and a fourth input/output peripheral module 14 are mounted side-by-side. The input/output peripheral modules 11, 12, 13, 14 are connected to the interface module 20 via a rear panel bus. By way of this internal rear panel bus, the input/output peripheral modules 11, 12, 13, 14 can exchange data with the interface module 20, in particular input data from sensors or output data to actuators.

Provided in the interface module 20 is at least one input/output module 21, in which interconnect information is stored, where the interconnect information creates an association between inputs/outputs of the one or more input/output peripheral modules 11, 12, 13, 14 and the control devices 1, 2.

In order to enable direct communication from the first control device 1 to the second control device 2, the interface module 20 has a virtual data set module 22 in which a data set receiving module 40 is associated with the first control device 1 (see FIG. 2) and to which the first control device 1 can write a data set 60, and furthermore a data set transmitting module 42 is associated with the second control device 2 from which the second control device 2 can retrieve the data set 60', and simultaneously, in the virtual data set module 22, the data set 60 of the first control device 1 is copied from the data set receiving module 40 to the data set transmitting module 42, as a data set 60' for the second control device 2.

Figure 2:
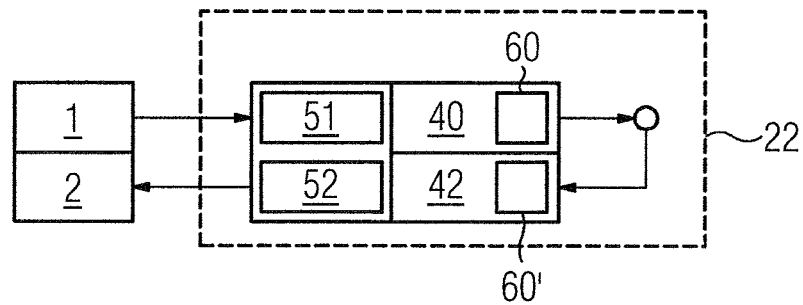
FIG. 2 shows a virtual data set module for accessing two control devices in accordance with the invention.

FIG. 2 illustrates the virtual data set module 22 in accordance with an embodiment of the invention for communication between the first control device 1 and the second control device 2. By associating the data set receiving module 40 with the first control device 1, a first channel 51 is formed for the first control device 1. By associating the data set transmitting module 42 with the second control device 2, a second channel 52 is formed for the second control device 2. In this arrangement, the first control device 1 can communicate directly, over a data transmission path that includes the first channel 51 and the second channel 52, with the second control device 2, by way of the peripheral module 20.

Figure 3:
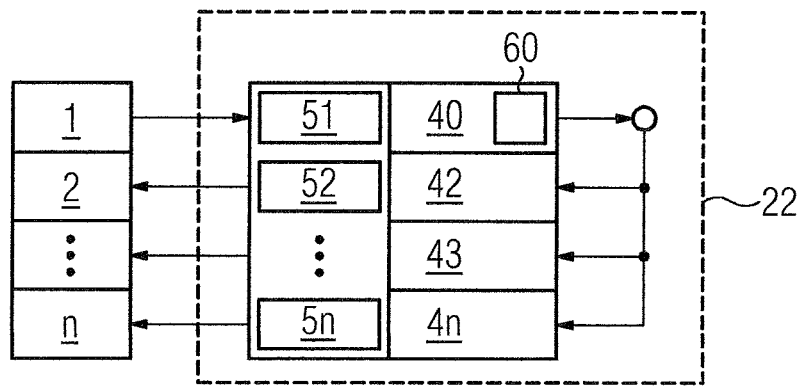
FIG. 3 shows the virtual data set module for accessing n controllers.

As shown by FIG. 3, it is likewise possible for n control devices to communicate. According to the example in FIG. 3, the first control device 1 makes the data set 60 available over the first channel 51. The data set 60 is copied to the data set transmitting module 42, and further to a second data set transmitting module 43, and so on, until the data set is copied to an nth data set transmitting module 4n. In this arrangement, the data set transmitting module 42 is associated with the control device 2 via the second channel 52, and the nth data set module 4n is associated with an nth control device n via an nth channel 5n. The first control device 1 can thus serve as a transmitter for data sets and the remaining control devices, 2, . . . , n can serve as receivers of the data sets by way of the corresponding channels 52, . . . , 5n for the data sets.

Figure 4:
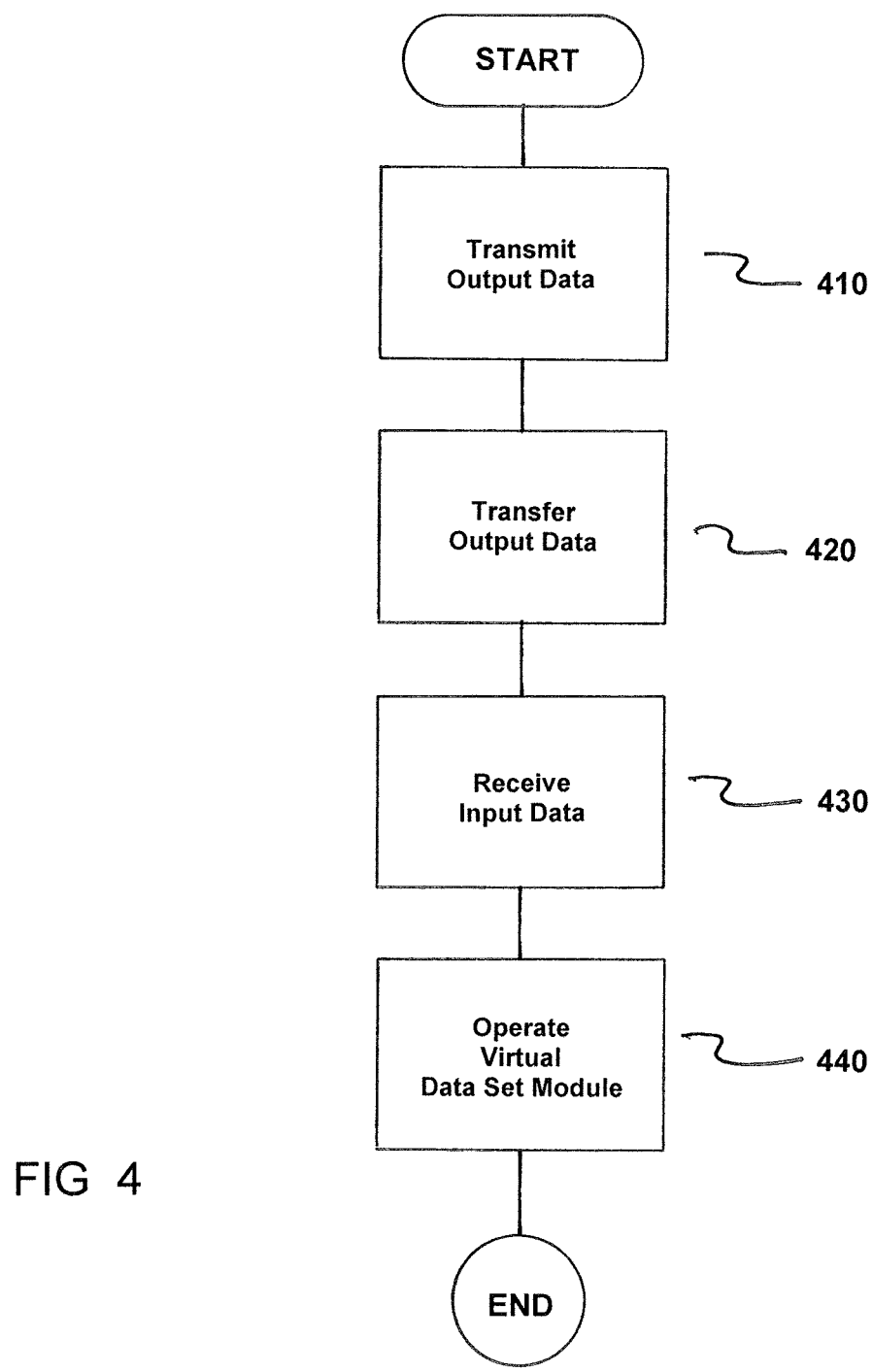
FIG. 4 is a flowchart of the method in accordance with the invention.

FIG. 4 is a flowchart of the method for operating an automation system 50, where a first control device 1 and a second control device 2 exchange data with a peripheral assembly 10 over a field bus 3. The method comprises transmitting output data to a peripheral module 20, as indicated in step 410.

Next, the output data is transferred to an input/output peripheral module 11 over an input/output module 21 in an interface module 20 of the peripheral assembly 10, as indicated in step 420.

Next, input data is received from the peripheral module 20, as indicated in step 430. In accordance with the method of the invention, the input data is received from the input/output peripheral module 11 over the input/output module 21 in the interface module 20 of the peripheral assembly 10.

A virtual data set module 22 is now operated in the interface module 20, as indicated in step 440. In accordance with the method of the invention, the virtual data set module 22 includes a data set receiving module 40 that is associated with the first control device 1 and to which a data set 60 is writable by the first control device 1, and includes a data set transmitting module 42 that is associated with the second control device 2 and from which the data set 60' is retrievable by the second controller 2, and simultaneously, within the virtual data set module 22, the data set 60 of the first control device 1 is copied from the data set receiving module 40 to the data set transmitting module 42, as a data set 60' for the second control device 2.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation system, comprising:
   a first control device having a first field bus terminal;
   a second control device having a second field bus terminal;
   a field bus coupled to the first and second control devices; and
   a peripheral assembly coupled to the field bus and having at least one input/output peripheral module for connection to at least one of sensors and actuators, the peripheral assembly including an interface module having a third field bus terminal for communication to and/or from the control devices, and the interface module having at least one input/output module storing interconnect information which creates an association between inputs/outputs of the at least one input/output peripheral modules and the first and second control devices;
   wherein the interface module further includes a virtual data set module in which a data set receiving module is associated with the first control device to which a data set is writable by the first control device, and further includes a data set transmitting module, within the data set module, associated with the second control device from which the data set is retrievable by the second control device; and
   wherein the virtual data set module is simultaneously formed such that the data set is copied from the data set receiving module to the data set transmitting module such that a communication path is established between the first and second control devices.

2. A method for operating an automation system, a first control device and a second control device exchanging data with a peripheral assembly over a field bus, the method comprising:
   transmitting output data to a peripheral module;
   transferring the output data to an input/output peripheral module over an input/output module in an interface module of the peripheral assembly;
   receiving input data from the peripheral module, the input data being received from the input/output peripheral module over the input/output module in the interface module of the peripheral assembly; and
   operating a virtual data set module in the interface module;
   wherein the virtual data set module includes a data set receiving module which is associated with the first control device and to which a data set is writable by the first control device, and includes a data set transmitting module which is associated with the second control device and from which the data set is retrievable by the second control device; and
   wherein simultaneously, within the virtual data set module, the data set of the first control device is copied from the data set receiving module to the data set transmitting module, as a data set for the second control device.

3. The method as claimed in claim 2, wherein associating the data set receiving module with the first control device causes formation of a first channel for the first control device, and associating the data set transmitting module with the second control device causes formation of a second channel for the second control device;
   wherein the first control device communicates with the second control device via the peripheral module over a data transmission path which includes the first channel and the second channel.

* * * * *